C. Hellen,
Egg-Cup,

№ 69,665.          Patented Oct. 8, 1867.

Witnesses
Geo. H. McGill
Eugene Hellen

Inventor
Clifton Hellen

United States Patent Office.

CLIFTON HELLEN, OF WASHINGTON, DISTRICT OF COLUMBIA.

Letters Patent No. 69,665, dated October 8, 1867.

---

IMPROVED EGG-CUP.

---

*The Schedule referred to in these Letters Patent and making part of the same.*

---

TO ALL WHOM IT MAY CONCERN:

Be it known that I, CLIFTON HELLEN, of the city and county of Washington, District of Columbia, have invented a new and useful Improvement in Egg-Cups; and I do hereby declare that the following is a full, clear, and exact description thereof.

My invention consists in constructing an egg-cup possessing all the qualities of an ordinary egg-cup for holding eggs, and also those of a tongs for picking up eggs—a quality very desirable in the handling of hot eggs. To do this I construct my cup of two separate sides, each side possessing half of the bowl for holding the egg and half of the base, or two of the feet upon which the cup stands. These sides are connected together at their centre by a hinge, and a bow-spring is inserted between the two sides, at their base, for the purpose of keeping said base or feet apart and pressing the top of the sides together. When it is desired to use the cup, its feet or base are pressed together by the fingers, which open the bowl of the cup; the bowl is then placed over an egg and the base or feet allowed to separate, which closes the sides of the bowl on the egg, thereby grasping and holding it tightly. The cup can then be set on its feet or base on the table, and the egg eaten from it, or the cup can be held over a glass and the egg emptied into it. In either case the fingers need not touch the egg, and no inconvenience need be experienced from the heat of the egg. The following is a description of the accompanying drawings:

Figure 1 is a full view of the egg-cup with an egg in it. A A are the sides of the bowl which holds the egg. B B are its feet or base. C is the hinge, which connects the sides together. D is the spring, which presses the feet or base apart, and the sides A A of the bowl together. E is the egg.

Figure 2 is a side view of the egg-cup with an egg in it. A is one of the sides. B B are the feet of the cup. E is the egg, and H is a depression between the feet, by which the cup is held and manipulated.

Figure 4:
Figure 4 is the spring D. This spring can be made either an elliptic, like the one represented in this figure, or a segment of a circle.
Figure 3:
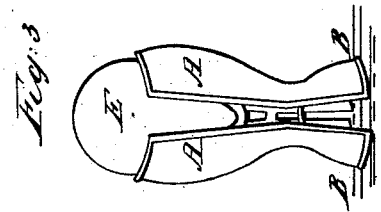
Figure 3 is a full view of the egg-cup with the base of the sides running all round instead of being separated into feet. A A are the sides of the bowl, B B the base, C the connecting hinge, D the spring, and E the egg.
Figure 2:
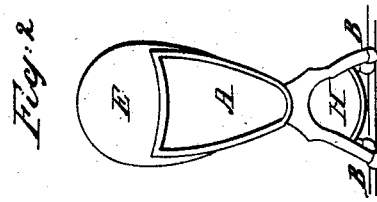
Figure 1:
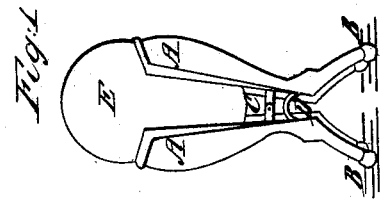

What I claim as my invention, and desire to secure by Letters Patent, is—

An egg-cup, formed of the sides A A, consisting of the bowl for holding the egg, and the base or feet B B, on which the cup stands, in combination with the hinge C, and spring D, as herein set forth and described.

CLIFTON HELLEN.

Witnesses:
GEO. W. McGILL,
EUGENE HELLEN.